3,505,211
SEPARATION OF HYDROCARBONS BY TYPE II HYDRATE FORMATION
Herbert J. Gebhart, Jr., Ferguson, and Earle C. Makin, Jr., St. Louis, Mo., assignors to Monsanto Company, St. Louis, Mo., a corporation of Delaware
No Drawing. Continuation-in-part of application Ser. No. 606,532, Jan. 3, 1967. This application May 29, 1968, Ser. No. 732,904
Int. Cl. C10g 29/20
U.S. Cl. 208—308                                10 Claims

ABSTRACT OF THE DISCLOSURE

Hydrocarbon components that do not normally form hydrates with water can be separated from mixtures of said hydrocarbon components by contacting said mixtures with water and a halogen-containing hydrate-forming agent capable of causing the formation of a Type II hydrate. By carrying out the contacting at a temperature below the hydrate formation temperature and at a pressure at least equal to the saturation pressure of the system, the hydrocarbon component having the smallest molecular bulk is preferentially encapsulated in the hydrate.

CROSS REFERENCE TO RELATED APPLICATION

This is a continuation-in-part of our copending application Ser. No. 606,532, filed Jan. 3, 1967, now abandoned.

BACKGROUND OF THE INVENTION

The present invention relates to a process for the separation of mixtures of organic compounds. More particularly, the present invention relates to a new and novel process for separating organic mixtures according to structure by formation of solid hydrates.

One of the most fundamental problems involved in the chemical industry today is that of the separation of mixtures of organic compounds. In many instances, this problem may be solved by simple fractional distillation. However, quite often such organic mixtures contain two or more compounds which form azeotropes or whose boiling points are of such close proximity that fractional distillation is impractical. With such mixtures as these, other separations techniques are generally required. While many such possible alternate separations techniques are known to the prior art such as solvent extraction, extractive distillation, selective adsorption, etc., there is a continuing need for additional separatory processes which may be applied to the separation of those organic mixtures not readily susceptible to separation by fractional distillation.

It is an object of the present invention to provide a new process for the separation of organic mixtures. Another object of the present invention is to provide a new process for the separation of hydrocarbons according to molecular structure. A further object of the present invention is to provide a new process for the separation of hydrocarbons within the $C_4$ through $C_6$ molecular weight range by means of the formation of hydrates. Still another object of the present invention to provide a method for separating mixtures of hydrocarbons that do not normally form water-hydrocarbon hydrates by utilizing a particular hydrate-forming agent. Additional objects become apparent from the following description of the invention herein disclosed.

SUMMARY OF THE INVENTION

The present invention, which fulfills these and other objects is a process comprising contacting an organic mixture containing hydrocarbons with water and a hydrate-forming agent capable of causing the formation of a Type II hydrate at a temperature below the hydrate formation temperature and at a minimum pressure equal to the saturation pressure of the liquid system. A hydrate is thus formed and is then separated from the liquid remaining by decantation, filtration or other means well-known to the art and the hydrate then raised to a temperature above the hydrate formation temperature whereupon the hydrate is decomposed. The hydrocarbons which were selectively encapsulated by the hydrate may then be readily separated from the water and hydrate-forming agent. By means of the process of the present invention, hydrocarbons which are difficultly separable from one another by known procedures may be readily separated.

The hydrocarbons that are preferentially encapsulated by the Type II hydrates are those having the smallest molecular bulk. We use the term "molecular bulk" to define the geometric configuration and size of the hydrocarbon molecules that may be separated according to our invention. Two concepts are involved in our meaning of the term "molecular bulk." The first of these is the "major axis" which we define as the longest straight-chain arrangement of carbon atoms in the molecule. The second is the "minor axis" which we define as the longest straight-chain arrangement of carbon atoms in the molecule, exclusive of the major axis, and is a measure of the branching in the molecule. According to our definition, we say that n-pentane has a major axis of 5 carbon atoms, isopentane has a major axis of 4 carbon atoms, neopentane has a major axis of 3 carbon atoms.

In applying the foregoing concepts, we say that molecular bulk decreases with decreasing length of major axis irrespective of branching as long as the length of the major axis is not exceeded, and that encapsulation of these hydrocarbons by a given hydrate will increase in the order of decreasing molecular bulk.

When mixtures of hydrocarbons having equal major axis lengths are separated according to our invention, the hydrocarbon having the least amount of branching is preferentially encapsulated in the Type II hydrate. Thus n-butane and isopentane both have a major axis of 4 carbon atoms and n-butane will be preferentially encapsulated in the hydrate while isopentane will be preferentially excluded from the hydrate because n-butane has a smaller molecular bulk due to the fact that it has no branching.

When mixtures of compounds having equal major axis lengths and branching of 2 or more carbon atoms per molecule are separated by our invention, then the compound having the shortest minor axis will be preferentially encapsulated because its molecular bulk is smallest. Thus, 2,3-dimethyl butane would be preferentially encapsulated from a mixture of 2,3-dimethyl butane and 2,2-dimethyl butane because the 2,3-dimethyl butane has the shortest minor axis.

DESCRIPTION OF PREFERRED EMBODIMENTS

In order to further describe and particularly to illustrate the present invention, the following examples are presented. These examples are in no manner to be construed as limiting to the present invention.

EXAMPLE I

Distilled water (200 ml.) was cooled to less than 5° C. in a stainless steel autoclave equipped with a mechanical stirrer and cooled in a refrigerated constant temperature bath. The system was then evacuated to about 125 mm. Hg absolute and twelve ml. of Freon 11 (trichlorofluoro methane) added to the water. The mixture was stirred for about two hours at a temperature of approximately 4° C. A mixture of isobutane and n-butane in a weight ratio of 1:1 was introduced into the Freon 11 hydrate which formed. The autoclave was pressured up to 50 p.s.i.g. with helium and the mixture stirred for three hours at a temperature of 4° C. The pressure was released and the autoclave opened. The hydrate was then separated from the liquid and the temperature of the hydrate raised above the decomposition temperature. The hydrocarbon fraction recovered from the decomposed hydrate was found to contain 80.2% by weight isobutane and 19.8% by weight n-butane. The isobutane weight ratio, therefore, increased from 50% to 80.2% for a 60.2% increase in a single-stage separation.

EXAMPLE II

Example I was substantially repeated with the exception that 15 ml. of Freon 11 were used and the hydrocarbon mixture consisted of 51.42% by weight n-butane, 48.41% by weight isobutane and 0.17% by weight of other unidentified components. The hydrate which formed in the liquid was separated by filtration and the hydrate decomposed. The hydrocarbon fraction of the decomposed hydrate was subjected to analysis and found to consist of 81.4% by weight isobutane and 18.6% by weight n-butane. This represents an increase in isobutane concentration in the mixture from 48.4% to 81.4% or an increase of 68.2% in a single separatory stage.

EXAMPLE III

The process described in Example I was repeated with the exception that the hydrocarbon feed consisted of 75% by weight n-butane and 25% by weight isobutane. On analysis of the hydrocarbon fraction obtained after decomposition on the hydrate which formed, it was found that the hydrocarbon fraction consisted of 50.3% by weight isobutane and 49.7% n-butane. This represents an increase in isobutane concentration of from 25% to 50.3% or an increase of 101.2% in a single separatory stage.

EXAMPLE IV

Example I was again substantially repeated with the exception that nitrogen was used instead of helium for pressuring the autoclave. Also, the hydrocarbon mixture was one consisting of 49.6% by weight isobutane and 50.4% by weight n-butane. On analysis of the hydrocarbon fraction obtained after decomposition of the hydrate formed, it was found that the hydrocarbon fraction consisted of 86.5% by weight isobutane and 13.5% by weight n-butane. This represents an increase in isobutane concentration of from 49.6% in the feed to 86.5% in the hydrate fraction for an increase of 74.4% in a single separatory stage.

EXAMPLE V

One hundred fifty gm. of ice were added to a precooled stainless steel cell maintained at 4° C. The cell was evacuated to about 125 mm. Hg (absolute) and 20 ml. (28.8 gm.) of Freon 11 added. About 10 gm. of a mixture consisting of 33.9% by weight neopentane, 31.1% by weight isopentane and 35.0% by weight n-pentane were added to the cell and the cell pressurized to 50 p.s.i.a. with nitrogen and maintained at a temperature of 4° C. A crystalline hydrate rapidly formed at 4° C. with a 6 p.s.i.g. drop in cell pressure. The crystalline hydrate was removed from the cell, filtered cold and subsequently dissociated by warming and the hydrocarbon fraction collected therefrom. The hydrocarbon fraction obtained from the hydrate phase was found to consist of 55.5% by weight neopentane, 23.1% by weight isopentane and 21.4% by weight n-pentane. This represents an increase in neopentane concentration of from 33.9% in the feed to 55.5% in the hydrate fraction or an increase of 63.7%. Along with this, the ratio of isopentane to n-pentane increased from 0.9:1 to 1.1:1.

EXAMPLE VI

One hundred gm. of ice and 50 gm. of cold water were added to the cell described in Example V which was maintained at 4° C. in a constant temperature bath. To this was added 20 ml. (28.8 gm.) of Freon 11 in the manner described in Example V. Approximately 15 ml. of a mixture of $C_6$ hydrocarbons containing 47.55% by weight neohexane and 30.85% by weight n-hexane were then added and the system pressurized to 50 p.s.i.g. with nitrogen. The mixture was stirred for three hours at 4° C. A crystalline hydrate formed and a sample of the hydrate taken and filtered and then washed twice with wet-ice-cooled n-pentane to remove unreacted hydrocarbons adhering to the hydrate crystals. The hydrate was decomposed and the hydrocarbon fraction recovered therefrom. This hydrocarbon fraction was found to consist of 65.5% by weight neohexane and 34.4% by weight n-hexane. This represents an increase in neohexane concentration of from 47.55% by weight in the feed to 65.6% by weight in the hydrocarbon fraction obtained from the hydrate or an increase of 38% in neohexane concentration.

EXAMPLE VII

A feed mixture consisting of 67.2% by weight of isobutene, 23.1% by weight n-butene, 5.0% by weight n-butane, 4.4% by weight isobutane and 0.3% by weight butadiene is continuously introduced in liquid phase into a cylindrical column at about the midpoint of said column. Freon 11 and water in a weight ratio of approximately 1:5 are continuously introduced into the column near the top thereof. In the column, the Freon 11 and water countercurrently contact the hydrocarbon mixture. The temperature within the column ranges from approximately +3 to +5° C. at the bottom to +1 to +2° C. at the top of the column. An overhead fraction is continuously taken from the top of the column. This overhead contains the hydrocarbons not encapsulated by the hydrate. A bottoms fraction is also continuously taken from the column. This bottoms is the hydrate and the hydrocarbons encapsulated therein. The hydrate is passed to a recovery zone wherein the temperature is raised and the hydrate dissociated. Hydrocarbons in this zone are separated from the Freon and water and the Freon and water recycled to the column. On analysis, the overhead fraction is found to contain 4.5% by weight isobutene 0.13% by weight isobutane, 77.57% by weight n-butenes, 16.8% by weight n-butane and 1.01% by weight butadiene.

EXAMPLE VIII

The procedure of Example I is followed using a hydrocarbon mixture of 50% by weight n-hexane and 50% by weight benzene. The hydrocarbon fraction recovered from the hydrate is essentially pure n-hexane.

The process of the present invention is particularly adapted for the separation of mixtures of hydrocarbons that normally do not form hydrates with water alone. The Type II hydrates produced from the water and the hydrate-forming agents have a specific selectivity for encapsulating the hydrocarbons from the mixture that have the smallest molecular bulk. As a result, the hydrocarbon mixtures which may be separated in accordance with the present invention contain both straight-chain hydrocarbons and branched-chain hydrocarbons. Though a wide range of such hydrocarbons may be separated by the process, the process is most useful for the separation of straight-chain and branched-chain hydrocarbons within the $C_4$ through $C_6$ molecular weight range.

The hydrocarbons which may be separated include acyclic unsaturated hydrocarbons as well as acyclic saturated hydrocarbons. Among the hydrocarbon mixtures which may be readily separated by the process of the present invention are mixtures containing n-butane and isobutene, n-butenes and isobutene, n-butenes, butadiene and isobutene, n-pentane and neopentane and/or isopentane, n-pentenes and neopetene and/or isoprene, n-hexane and isohexanes and/or neohexane, n-hexenes and isohexenes and/or neohexene, n-hexadiene and isohexadienes and combinations thereof. Our invention can also be used to separate the above-mentioned acyclic hydrocarbons from other organic compounds including cycloaliphatic, aromatic and heterocyclic compounds.

The hydrate-forming agents useful in the process of the present invention are those capable of forming Type II hydrates. Type II hydrates and the means of forming such are well described by R. M. Barrier in chapter 6, particularly pages 313 through 324, of the publication, "Non-Stoichiometric Compounds," published by Academic Press, 1964. For the purposes of the process of the present invention, the hydrate-forming agents most often are compounds selected from the group consisting of halohydrocarbons. Several nonlimiting examples of such compounds are Freon 13B1 ($CF_3Br$), Freon 12 ($CCl_2F_2$), Freon 152a ($CH_3CHF_2$), Freon 22 ($CHClF_2$), Freon 22B1 ($CHF_2Br$), Freon 142b ($CH_3CFCl_2$), Freon 12B1 ($CF_2ClBr$), Freon 21 ($CHCl_2F$), Freon 12B2 ($CF_2Br_2$), Freon 11 ($CCl_3F$), ethyl chloride, ethyl bromide, chloroform, carbon tetrachloride, methyl iodide, and the like. Regardless of the hydrate-forming agent used, it is preferred that the hydrate-forming agent have a molecular length within the range of 5.8 to 7.0 angstrom, more preferably, 5.8 to 6.65 angstroms. The preferred hydrate-forming agents for the practice of the present invention are Freon 11, Freon 21, Freon 22, Freon 142b, Freon 152a and Freon 12.

In carrying out the process of the present invention, the hydrocarbon mixture to be separated is contacted with water and the hydrate-forming agent at a temperature below the hydrate formation temperature. The term "hydrate formation temperature" as used herein, means the maximum temperature at which a given hydrate can exist. This temperature, of course, will vary depending upon the pressure, the hydrate-forming agent and the hydrocarbon mixture being separated. The temperature at which a hydrate will form with a particular hydrate-forming agent is directly related to the pressure. As pressures are reduced, the hydrate forms at lower temperatures while, conversely, as pressure is increased, the hydrate may be formed at higher temperatures. Generally, the temperatures at which the hydrates are formed in accordance with the process of the present invention will not be lower than about −10° C. and will not be greater than 20° C. For the aforementioned preferred group of the hydrate-forming agents when used to separate hydrocarbon mixtures containing hydrocarbons of 4 to 6 carbon atoms, temperatures within the range of 3° C. to 16° C. preferably are employed.

With respect to the pressures at which the hydrates are formed in accordance with the process of the present invention, such pressures are defined as the minimum pressure equal to the saturation pressure of the liquid system. If lower pressures are employed, liquid-solid extraction cannot be maintained since no hydrate phase exists. The maximum pressure to be employed is generally not critical or limiting as the process proceeds satisfactorily at pressures higher than the mixture saturation pressure. As a practical matter, the pressures will usually be within the range of 0 to 150 p.s.i.g., again varying depending upon the temperature at which it is desired to form the hydrate, the hydrate-forming agent used and the particular hydrocarbons being separated in accordance with the process.

In forming the hydrates of the process of the present invention, usually water is present in a minimum of 2 parts by weight per part by weight of hydrate-forming agent. The maximum weight of water is not particularly critical and can be varied widely. As a practical matter, however, amounts of water above 15 parts of water per part by weight hydrate-forming compound are seldom used. Within the above limitations, the optimum water to hydrate-forming compound weight ratio will vary depending upon the hydrate-forming compound employed, the hydrocarbon to be separated and whether it is desired to operate with a light or heavy slurry of hydrate crystal in water. With the preferred hydrate-forming agents, it is usually preferred to have a water to hydrate-forming compound weight ratio within the range of 2.5:1 to 10:1.

The amount of hydrate-forming agent employed in carrying out the process of the present invention may be varied widely depending upon the efficiency of separation, the hydrocarbon system to be separated and the efficiency of the contact of the components of the system. Normally, it requires a minimum of one mole of hydrate-forming agent to effect separation of two moles of the hydrocarbons having the smallest molecular bulk from admixture with hydrocarbons having larger molecular bulks. Therefore, a mole ratio of at least 1:2 of hydrate-forming compound to the hydrocarbon having the smallest molecular bulk is most often used though lesser ratios might be used if desired. Seldom will a mole ratio greater than 1:1 of hydrate-forming compound to the hydrocarbon having the smallest molecular bulk be employed.

In carrying out the separation process of the present invention, the water, hydrate-forming compound and the hydrocarbon mixture to be separated may be brought into contact with one another above the hydrate formation temperature, intimately mixed and then the mixture reduced below the hydrate formation temperature. Alternatively, the water, hydrate-forming compound and hydrocarbon mixture may be concurrently introduced into contact with one another below the hydrate formation temperature thereby causing almost instantaneous formation of the hydrate containing the encapsulated branched-chain hydrocarbons. In another embodiment, the water and hydrate-forming compound may be contacted under conditions to form a hydrate and the hydrocarbon mixture to be separated then brought into contact therewith under the above-described conditions. As a practical matter, it is usually desired to operate the present process in accordance with either of the first two methods above.

What is claimed is:

1. A process for the separation of non-hydrate-forming hydrocarbons which comprises contacting a mixture consisting of said hydrocarbons in liquid phase with water and a halohydrocarbon hydrate-forming agent capable of causing the formation of a Type II hydrate at a temperature below the hydrate formation temperature of the water and said hydrate-forming agent and at a minimum pressure equal to the saturation pressure of the liquid system and then separating the hydrate formed and the liquid remaining.

2. The process of claim 1 wherein said hydrocarbons are acyclic and contain from 4 to 6 carbon atoms per molecule.

3. The process of claim 1 wherein said hydrate-forming agent is a compound having a molecular length of 5.8 to 7.0 angstroms.

4. The process of claim 3 wherein said hydrate-forming agent is selected from the group consisting of compounds having the formulae $CCl_3F$, $CHCl_2F$, $CH_3CFCl_2$, $CH_3CHF_2$, and $CCl_2F_2$.

5. The process of claim 4 wherein said mixture contains n-butenes and isobutene.

6. The process of claim 1 wherein the hydrate formation temperature is within the range of 0 to 20° C.

7. The process of claim 1 wherein the water is present in a ratio by weight to the hydrate-forming compound within the range of about 2:1 to 15:1.

8. The process of claim 1 wherein the hydrate-forming compound is present in a mole ratio to the hydrocarbon having the smallest molecular bulk in the mixture to be separated of at least 1:2.

9. The process of claim 1 wherein the pressure is in the range of 0 to 150 p.s.i.g.

10. The process of claim 1 wherein the hydrate formed is raised to a temperature above the hydrate formation temperature to thereby decompose said hydrate, and the hydrocarbon fraction recovered therefrom is substantially richer in the hydrocarbon having the smallest molecular bulk than the original mixture.

References Cited

UNITED STATES PATENTS

| 2,399,723 | 5/1946 | Crowther | 260—676 |
| 2,410,583 | 11/1946 | Hutchinson | 260—676 |

HERBERT LEVINE, Primary Examiner

U.S. Cl. X.R.

62—12; 260—676